Figure 1:
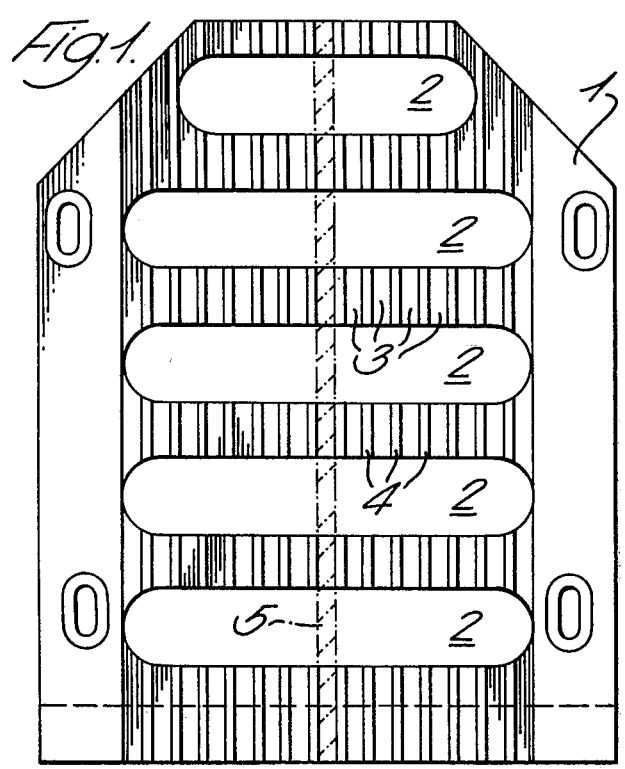

United States Patent [19]

Dorey

[11] 4,263,035

[45] Apr. 21, 1981

[54] HANDLING OF HOT ARTICLES

[75] Inventor: Roger J. Dorey, Harpenden, England

[73] Assignee: United Glass Limited, Middlesex, United Kingdom

[21] Appl. No.: 959,183

[22] Filed: Nov. 7, 1978

[30] Foreign Application Priority Data

Nov. 22, 1977 [GB] United Kingdom ........... 48598/77

[51] Int. Cl.³ .................... B32B 3/10; B32B 3/30; B32B 27/04; F26B 25/18
[52] U.S. Cl. ...................................... 65/348; 34/238; 34/239; 65/355; 65/374 R; 65/374 RM; 428/131; 428/138; 428/167; 428/368; 428/396; 428/473.5; 428/573; 428/596
[58] Field of Search ................. 65/374 RM, 348, 351, 65/355, 374 R; 428/131, 136, 167, 138, 368, 396, 137, 473.5, 573, 575, 596; 248/346; 34/237–239

[56] References Cited

U.S. PATENT DOCUMENTS

| 212,645 | 2/1879 | Baumann | 34/237 |
|---|---|---|---|
| 745,812 | 11/1903 | Gang et al. | 74/372 |
| 1,073,151 | 9/1913 | Matthew | 34/238 |
| 3,469,963 | 9/1969 | Beattie | 65/374 RM |
| 3,607,196 | 9/1971 | Garvey | 65/348 X |
| 3,853,600 | 12/1974 | Hou | 428/473.5 X |
| 3,973,943 | 8/1976 | Seymour | 65/374 RM X |
| 4,100,138 | 7/1978 | Bilow et al. | 428/473.5 X |
| 4,156,049 | 5/1979 | Hodes et al. | 428/473.5 X |
| 4,185,986 | 1/1980 | Frank | 65/348 X |

Primary Examiner—George F. Lesmes
Assistant Examiner—Alexander S. Thomas
Attorney, Agent, or Firm—Cushman, Darby & Cushman

[57] ABSTRACT

There is described a deadplate comprising a support having a plurality of spaced channels in which are retained article-contacting strips of a material which stand proud of lands between the channels, the material being lubricious and of low thermal conductivity.

9 Claims, 5 Drawing Figures

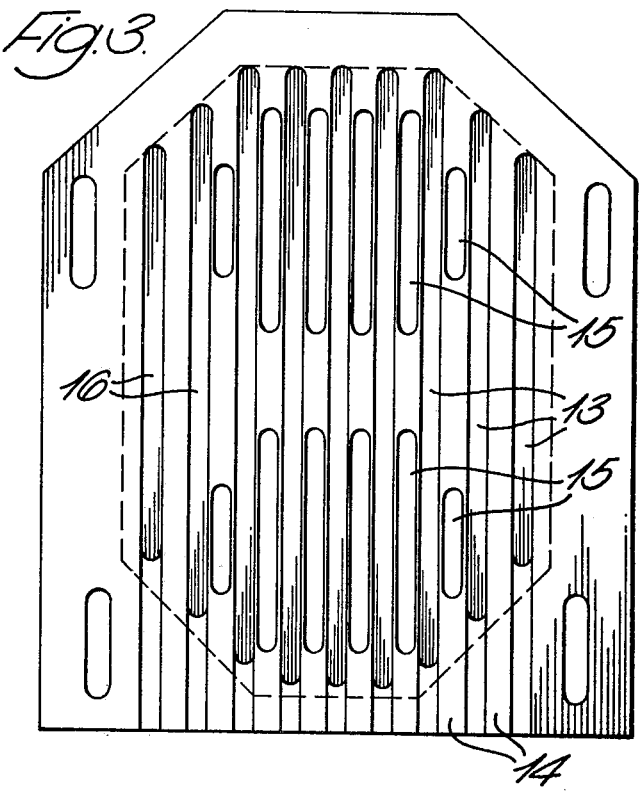
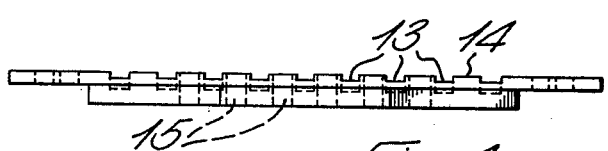

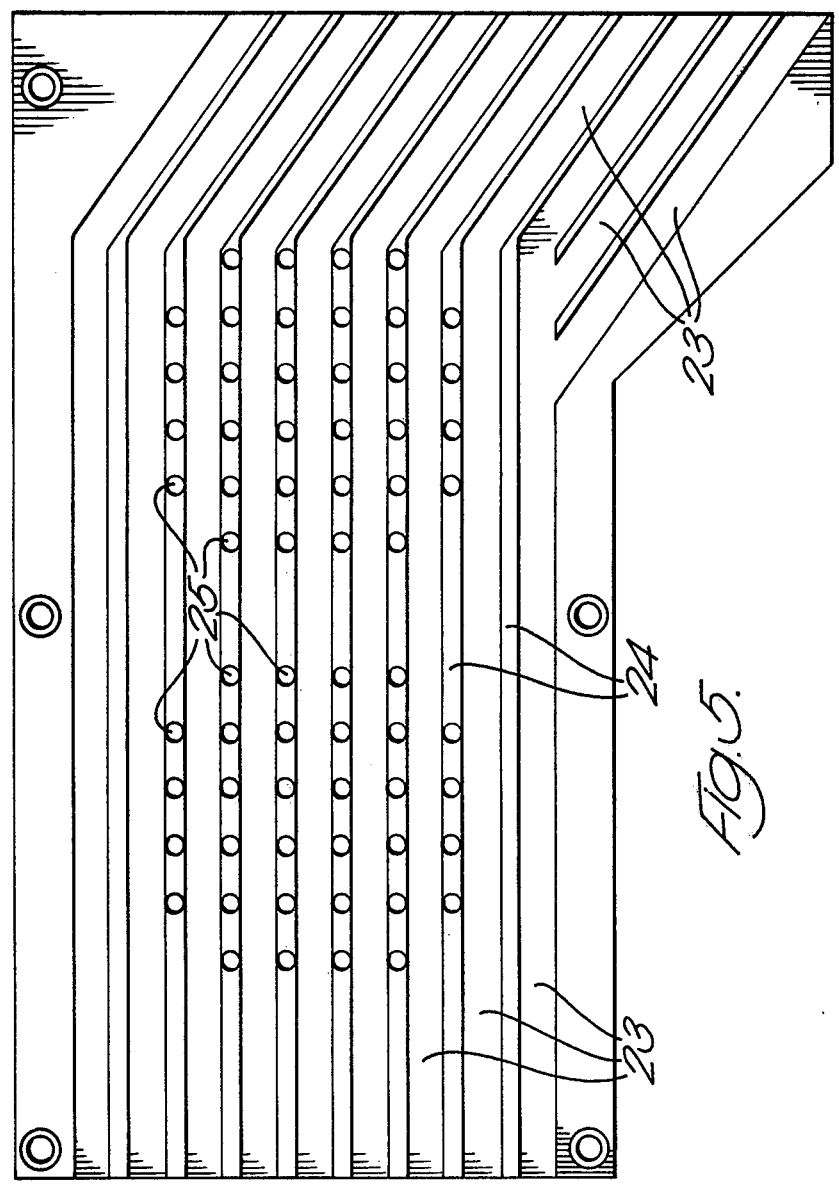

HANDLING OF HOT ARTICLES

This invention relates to the handling of hot articles such as hot glassware, and is especially concerned with the provision of a deadplate for use in glass-making machinery.

In the manufacture of glassware by automatic processes the molten glass issuing from the furnace is formed in a machine into the desired shape, and may then be transferred to a conveyor whence it is subsequently transferred into an annealing lehr. While the glass is at an elevated temperature, and is being handled on conveyors and by transfer equipment such as pusher-bars and gripping and lifting devices, the glass surface is extremely sensitive to damage by a hard or abrasive material. Furthermore the use as a handling device of a material of high thermal conductivity which may cause sudden cooling of the glass surface could result in the presence of small cracks in the glass surface. It is therefore common practice nowadays to use asbestos or asbestos-based materials to handle glass when it is at a temperature in the region of 400° to 600° C. for, despite the fact that these materials may be sufficiently hard to cause some abrasion damage to the glass, their low thermal conductivity ensures that thermal shock cracking can be avoided.

When a glass container is formed, it is normally transferred from the forming mould onto what is known as a deadplate, from which it is transferred to a moving conveyor. The deadplate, which is conveniently a mild steel plate or an asbestos-reinforced cement board, is the first object with which the newly-formed glass article, e.g. glass container, comes into contact. It is therefore highly desirable that contact between the newly formed glass article and the deadplate should in no way affect the integrity or surface characteristics of the glass article. Both metal plates and asbestos-cement plates tend to become coated with oil after a while, and this causes checking of the glass articles.

It is an object of the present invention to provide a novel form of deadplate, which does not suffer from the disadvantages inherent in the current use of metal and asbestos-cement plates, and according to the present invention a deadplate comprises a support having a plurality of spaced channels in which are retained article-contacting strips of a material which stand proud of lands between the channels, the material being lubricious and of low thermal conductivity as hereinafter defined.

As mentioned above, it is important that at the stage the hot glass article is placed onto the deadplate the integrity and surface characteristics of the article should be affected as little as possible. Thus, by a material which is "lubricious and of low thermal conductivity" we mean a material which will allow the support and passage over it of a hot glass article while cooling fluid is simultaneously being allowed to contact the article, without thermally shocking or abrading the glass article. A most suitable material is one which is described in our U.K. Patent Specification No. 49838/75 (French No. 7636365, U.K. Ser. No. 745,812, filed Nov. 29, 1976, now Pat. No. 4,146,668), and which is made by moulding a composition comprising a polyimide resin, carbon fibres and graphite.

Other materials which are suitable for this purpose are fibre-reinforced composites, e.g. a composition containing carbon fibres and graphite, or one containing carbon fibres and amorphous carbon. The strips of article-contacting material are preferably arranged such that the article-contacting surface of the strips contain a large number of fibre ends, i.e. the strips are arranged in the channels such that the fibres are aligned substantially normal to the article-contacting surface.

It will be appreciated that by means of the invention cooling air is enabled to contact a substantial proportion of the area of the base of the article, since, in contrast to the use of conventional deadplates, not all of the base of the article is in contact with the deadplate. In a preferred embodiment the support is provided with holes, which may be in the lands or in both the channels and lands between them, through which cooling air may be passed.

As mentioned, suitable strips for insertion in the channels of the support are made from those compositions described in our U.K. Specification No. 49838/75 (French No. 7636365, U.S. Ser. No. 745,812). A particularly suitable material is one made from a moulding composition comprising 30 to 70%, by weight, polyimide resin, especially 45–60% by weight polyimide resin. Typical compositions are those containing, by weight, 45–55% polyimide resin, 10–25% carbon fibre and 25–35% graphite. The polyimide resin sold under the trade name "Kinel 601" is a preferred one for the manufacture of strips for use according to the invention.

In the production of moulded sheets or plates by normal compression techniques from compositions such as those described above, the carbon fibres will be aligned in a plane perpendicular to the major direction of compression, that is in the plane of the sheet or plate. Strips especially suitable for use in the present invention may be produced from such sheets or plates by cutting those sheets or plates into strips, and rotating each strip 90° about its longitudinal axis. The strips may then be placed in the channels of the support, wherein they may be held as necessary by adhesives, for example a room-temperature vulcanising silicone adhesive such as RTV 106 (GEC).

The channels formed in the support, which is suitably a mild steel plate, are preferably at least 3 mm. apart. It will be appreciated that the precise spacing between channels, and therefore strips, will be chosen dependent upon the size of the article which is to be placed on the deadplate. These strips should not be spaced so far apart that they interfere with the smooth passage of the article from the deadplate to the adjoining conveyor. Preferably the strips themselves are at least 6 mm. wide. They stand proud of the adjacent lands by, for example, 1.5 mm. to 3 mm. and they are suitably embedded into the channels a distance at least 3 mm.

As mentioned, the support may be formed with holes, either in the lands, or in both the channels and lands so that the hot glass article and also the article-contacting strips may be cooled by cold air under pressure.

Suitably the article-contacting strips are aligned along the direction of travel of the glass article on the deadplate and if this direction of travel involves an angular component some of the strips may be placed at an angle to the others.

The materials described in our above-mentioned Patent Specifications, and which are especially suitable for use in the present invention, may have different properties as regards their thermal resistance and wear resistance. Thus, the strips placed in any particular deadplate may be a mixture of strips having good thermal resistance and strips having good wear resistance; in this way, it is possible to take the maximum advantage of the varying desirable properties of the carbon fibre-reinforced polyimide material and other suitable material.

In use, the deadplate of the invention will suitably be set up so that its article-contacting surface is on the same level as the receiving surface of the adjacent conveyor. After some use it is possible that the article-contacting surfaces of the strips will show signs of wear. If this be so, then it is a simple matter to shave the surfaces of the article-contacting strips, to bring them level once more, and then slightly to raise the support, suitably by means of shims, to bring the surfaces of the strips again into alignment with the surface of the adjoining conveyor.

Figure 2:

Several constructions of deadplate according to the invention are illustrated in the accompanying drawings, in which:

FIG. 1 is a plan view of one form of deadplate;
FIG. 2 is an end view of the plate of FIG. 1;
FIG. 3 is a plan view of a second form of deadplate;
FIG. 4 is an end view of the plate of FIG. 3; and
FIG. 5 is a plan view of a third form of deadplate.

Referring to FIG. 1, a mild steel plate 1 which is provided with a series of slots 2, has a series of longitudinal channels 3 separated by lands 4, the width of which is 3 mm. Each channel is 6 mm. wide and 6 mm. deep. Retained in each channel 3 is a strip 5 of a material which is lubricious and of low thermal conductivity, and is suitably one made in accordance with our above-mentioned Patent Specifications, preferably having its fibres oriented substantially at right angles to its upper surface. Each strip 5 is approximately 6 mm. wide and 9 mm. high, so that it stands proud of the adjacent lands 4 by 3 mm.

In the embodiment shown in FIGS. 3 and 4, the channels 13 are somewhat narrower than the adjoining lands 14. Certain of the lands 14 are provided with longitudinal slots 15, which allow the passage of cooling air. Each channel 13 retains a strip 16 of an article-contacting strip of a fibre-reinforced polyimide material.

In the embodiment shown in FIG. 5, the channels 23, in which are retained strips of article-contacting material, are angled at one end to follow the line of movement of containers placed on the deadplate from the left-hand side of the plate as shown in the drawing, whence the article is placed from a forming machine, to the right-hand side as shown in the drawing, from where the article is moved onto a conveyor. Each of the intervening lands 24 is provided with a plurality of holes 25 through which cooling air may be passed, and suitably such cooling air is diverted along the right-hand portions of the channels 23, where there are no holes 25, to keep the articles and the strips of article-contacting material relatively cool.

The invention also includes a deadplate support having a plurality of spaced channels for the retention therein of article-contacting strips of material. The support plate may be constructed of mild steel or other suitable metallic material, or it may be moulded or machined from a thermoset polymeric material such as that described in our above-mentioned Patent Specifications. Examples of support plates in accordance with this aspect of the invention are that designated 1 in FIG. 1, and those illustrated in FIGS. 3, 4 and 5.

We have found that the use of deadplates in accordance with the present invention shows several desirable advantages over the conventional use of asbestos-based or mild steel deadplates. Thus, oil which found its way onto the deadplate from time to time from the glass forming moulds could be readily removed since it did not become absorbed into the material of the deadplate; glass bottles placed on the deadplate did not thereby acquire marks on their bases such as is normal when asbestos-based deadplates are used. The relatively low thermal conductivity of the strip material prevented cracks occurring on the bases of the bottles, which is too frequently a problem with the use of deadplates. And finally, the windbox, which is situated below the deadplate and supplies the cooling air, may be operated at a lower pressure than with conventional deadplates with, as a result, a more uniform distribution of cooling air and hence a more dimensionally stable glass article since it does not deform on the deadplate.

I claim:

1. A deadplate comprising a support having a plurality of spaced channels in which are retained article-contacting strips of a material which stand proud of lands between the channels, the material being formed by molding a composition comprising a polyimide resin, carbon fibers and graphite.

2. A deadplate as in claim 1 wherein the channels or the lands of the support are provided with holes for the passage therethrough of cooling fluid.

3. A deadplate as in claim 1 wherein the lands between the channels are at least 3 mm wide.

4. A deadplate as in claim 1 wherein said strips are at least 6 mm wide and stand proud of the adjacent lands by between 1.5 mm and 3 mm.

5. In a machine for making glass articles of the kind including a forming mold and a deadplate for receiving and supporting hot newly-formed glass articles from the forming mold, an improved deadplate which comprises a support having an upper surface provided with a plurality of spaced channels in which are retained article-contacting strips which stand proud of lands between the channels, said strips being a moulded material which comprises polyimide resin, carbon fibers and graphite and which is lubricious and of low thermal conductivity defined as one which will allow the support and passage over it of a hot glass article while cooling fluid is simultaneously being allowed to contact the article, without thermally shocking or abrading the glass article.

6. A machine as claimed in claim 5 wherein the channels or the lands of the support are provided with holes for the passage therethrough of cooling fluid.

7. A machine as claimed in claim 5 wherein the lands between the spaced channels are at least 3 mm. wide.

8. A machine as claimed in claim 5 wherein the said strips are at least 6 mm. wide and stand proud of the adjacent lands by between 1.5 mm. and 3 mm.

9. A machine as in claim 5 wherein said strips are arranged in the channels such that the fibers are aligned substantially normal to the article-contacting surface of the respective strip.

* * * * *